May 31, 1966 S. A. PARKER 3,253,776
COMPRESSOR LUBRICATION ARRANGEMENT
Filed April 20, 1964 2 Sheets-Sheet 1

Inventor:
Sidney A. Parker
By Bair, Freeman & Molinare Attys

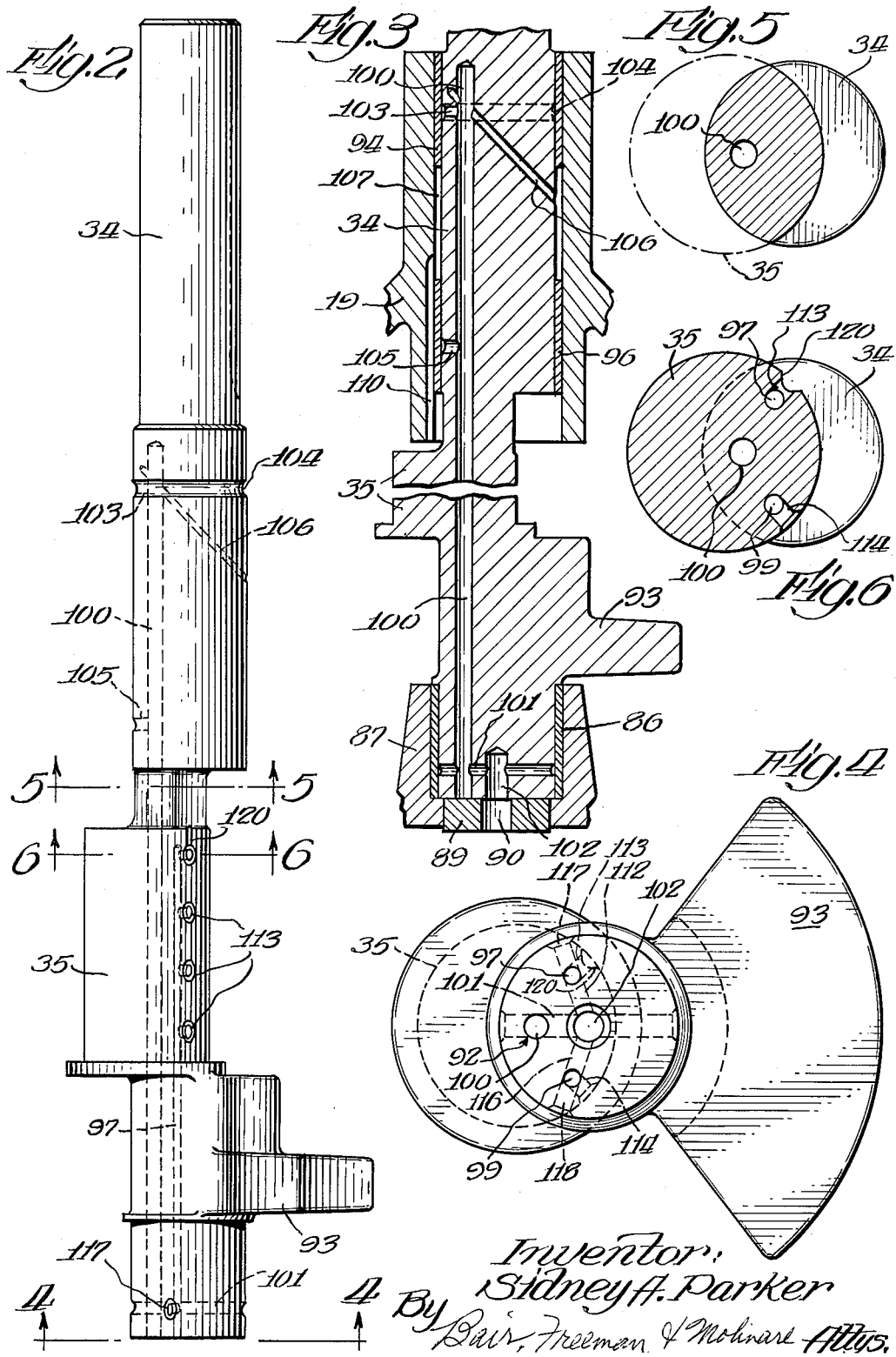

United States Patent Office 3,253,776
Patented May 31, 1966

3,253,776
COMPRESSOR LUBRICATION ARRANGEMENT
Sidney A. Parker, Fort Worth, Tex., assignor to Lennox Industries Inc., a corporation of Iowa
Filed Apr. 20, 1964, Ser. No. 361,126
6 Claims. (Cl. 230—206)

This invention relates to a hermetic refrigerant compressor and, more particularly, to an improved lubrication arrangement for such compressor. Still more particularly, this invention concerns a hermetic refrigerant compressor including a novel crankshaft construction having a plurality of lubricant pump means formed integrally therein.

In one form of high-speed hermetic refrigerant compressor in common use today, the electric drive motor and the compression mechanism are mounted one above the other on a common vertically disposed crankshaft. Normally, the crankshaft is journalled in bearings in the crankcase adjacent the lower end thereof and intermediate the compression mechanism and the electric motor. The upper bearings are not immersed in lubricant and thus lubrication must be provided at these bearing surfaces. In addition, the connecting rod bearing surface on the crankshaft must be lubricated.

The results of inadequate bearing lubrication are bearing failure and ultimately damage to the compression mechanism and possibly to the electric motor for driving such compression mechanism.

Some of the lubrication problems arise from the nature of the lubricant and the refrigerant in use today. The refrigerants are usually chlorinated fluorinated hydrocarbons as for example, "Freon," which are soluble in the oil-lubricant. Due to the miscibility of the oil and refrigerant, some refrigerant may be carried with the lubricant and interfere with proper lubrication of the bearing surfaces.

Two of the essential requirements for proper lubrication of bearing surfaces within a hermetic refrigerant compressor of the type described are (1) pressurization of each of the bearing surfaces and (2) venting of the lubricant supply passages for preventing refrigerant vapor and foam from interfering with the supply of lubricating oil to the bearing surfaces.

One method of lubricating the bearing surfaces on the crankshaft has been to provide a high-capacity, high-pressure pump in the sump within the refrigerant compressor to force lubricant through a passage in the crankshaft to the lower bearing means and to the upper bearing means. The use of a separate pump within the hermetic refrigerant compressor is not entirely satisfactory, for such separate pump mechanism occupies space, thus increasing the overall size of the hermetic refrigerant compressor. Further, power to the separate pump mechanism must be supplied from the electric motor driving the compression mechanism, thus reducing the efficiency of operation of the electric motor and hence of the compressor. Too, the use of a separate high-pressure pump increases the cost of a hermetic refrigerant compressor.

Traditionally, these high-pressure pumps have been troublesome for they utilize many parts to make them usable for either clockwise or counter clockwise rotation. Foreign material passing through the pump, such as that which might be left in the compressor during manufacture or refrigeration system build up, has caused the reversing mechanism to malfunction, thus causing bearing failure.

A proposed low-cost arrangement for providing lubrication for the bearing surfaces comprises a single vertically disposed eccentric passage in the crankshaft having an inlet at the lower end of the vertical crankshaft in communication with the oil in the sump and a plurality of outlet ports terminating on the exterior surface of the crankshaft adjacent the desired bearing surfaces. During rotation of the crankshaft, the centrifugal forces acting on the oil entering the inlet end of the vertical passage causes the oil to flow upwardly through the passage to the respective surfaces to be lubricated. Though the latter arrangement for lubricating bearing surfaces possesses a number of advantages including freedom from moving parts other than those actually required in the motor compressor unit, in actual practice it has been found that the arrangement is not completely satisfactory. In some instances, bearing failure has been attributed to the fact that refrigerant dissolved in the lubricant oil tends to separate from the oil in the lubricant passageway formed in the crankshaft due to (1) heat generated by bearing friction, (2) motor heat transferred through the shaft from the motor, and (3) heat from compression transferred through the shaft, so that the lighter refrigerant vapor and foam formed as a result of the separation prevents any substantial quantity of lubricant from reaching the uppermost bearing surfaces. To overcome this problem it has been proposed that the bearing be vented or skived out to permit a free flow of lubricant between the crankshaft and the bearings. However, by providing a venting arrangement in this manner, the desired pressurization of the bearing surfaces is not maintained.

Another problem encountered in lubricating the crankshaft bearing surfaces in a hermetic refrigerant compressor by utilizing a single passage within the crankshaft is that there are no means provided for accommodating the separate lubrication requirements for the bearing surfaces adjacent the piston rods and the upper and lower bearing means which journal the crankshaft.

It has thus recognized as desirable to provide a crankshaft having a plurality of pump means therein for separately feeding the connecting rod bearing surfaces and the upper and lower crankshaft bearing surfaces. A further desideratum was to provide both high-pressure pump means and low-pressure pump means for feeding the connecting rod bearing surfaces.

However, in a crankshaft commonly used in upright refrigerant compressors having a single eccentric for driving the piston rods, there is a relatively thin section between the eccentric and the uppermost portion of the crankshaft. It was found that boring more than one passage through said section of adequate size to provide for proper lubrication and/or venting would so weaken the crankshaft, that it was unsatisfactory for present design requirements. Thus, there is a crankshaft strength problem which must be considered and overcome in the design of a single crankshaft having a plurality of pump means integrally therein for lubricating a plurality of bearing surfaces at different elevations.

An object of the present invention is to provide a hermetic compressor with an improved lubrication arrangement including a crankshaft having a plurality of pump means defined therein for assuring positive lubrication of all the crankshaft bearing surfaces.

Another object of the present invention is to provide a hermetic refrigerant compressor with reliable and efficient crankshaft pump means comprising a first pump for feeding the upper bearing surfaces and a low-pressure pump and a high-pressure pump for feeding the connecting rod bearing surfaces.

A further object of the present invention is to provide a hermetic refrigerant compressor with a novel lubrication arrangement including a crankshaft having a plurality of pump means integrally formed therein, such pump means assuring proper pressurization of each of the crankshaft bearing surfaces.

Further objects of the invention will become apparent as the following description proceeds and the features of novelty which characterize the invention will be pointed out with particularity in the claims annexed to and forming a part of this specification.

For a better understanding of the invention, reference may be had to the accompanying drawing, in which:

FIGURE 2 is a side view of a novel crankshaft embodying the present invention;

FIGURE 3 is a fragmentary cross-sectional view of the crankshaft, and illustrating the upper and lower crankshaft bearings;

FIGURE 4 is a bottom view of the crankshaft taken generally on the line 4—4 of FIGURE 2;

FIGURE 5 is a cross-sectional view of the crankshaft taken generally along the line 5—5 of FIGURE 2 with the lower portion of the crankshaft being shown in phantom; and FIGURE 6 is a cross-sectional view of the crankshaft taken generally along the line 6—6 of FIGURE 2.

Figure 1:
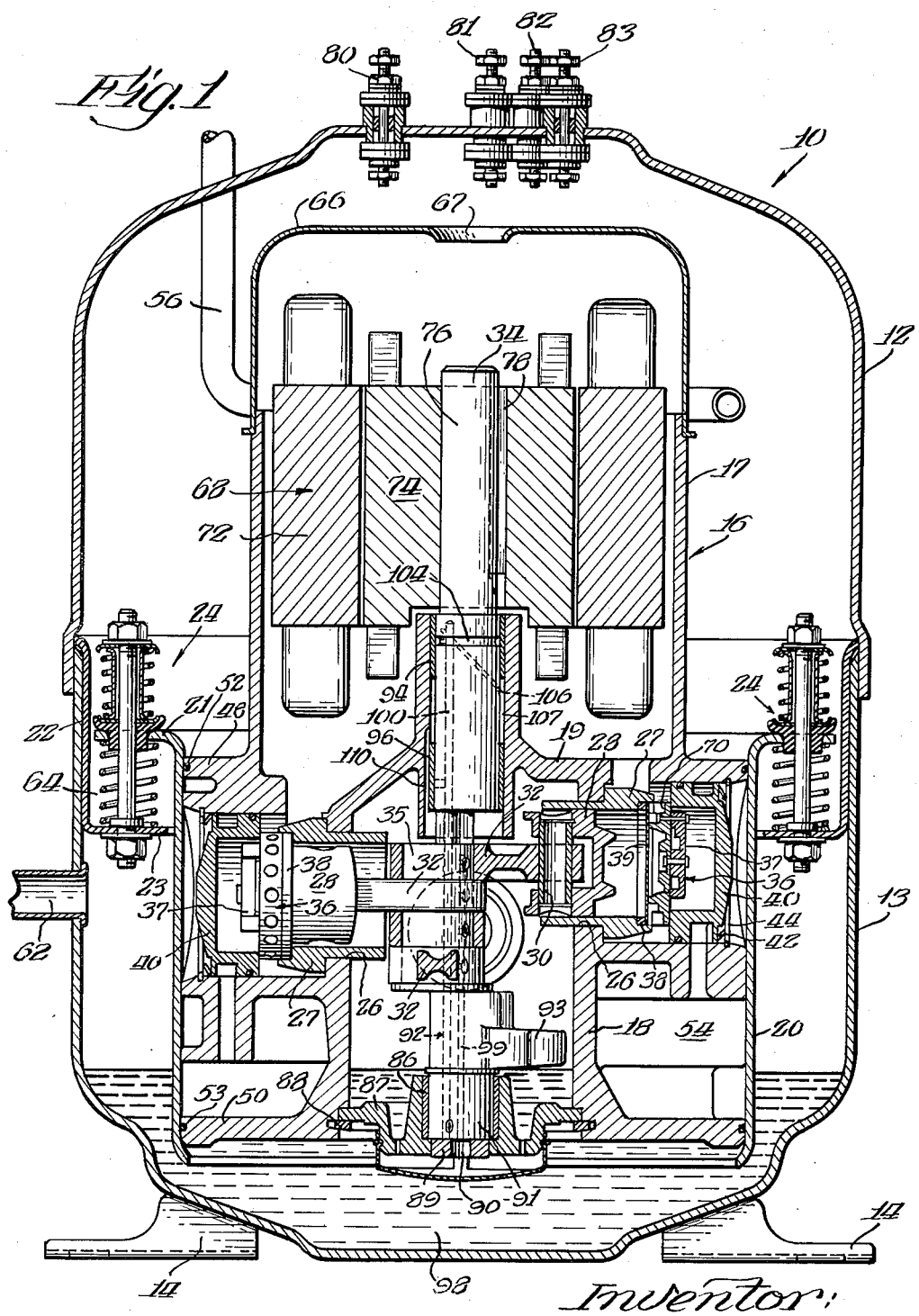
FIGURE 1 is a cross-sectional view of a hermetic refrigerant compressor embodying the improved lubrication arrangement of the present invention.

Referring to FIGURE 1, there is illustrated a compressor 10 embodying the present invention. The compressor comprises a gas-tight housing including an upper shell 12 and a lower shell 13 integrally joined to one another, as for example, by welding. To the bottom of the exterior surface of the lower shell 13 are welded a plurality of legs 14, by means of which legs the compressor may be supported in upright position within a condensing unit or an air conditioning unit.

Resiliently supported within the outer housing or casing of the compressor 10 is a compressor block 16 which comprises a motor flange portion 17 and a cylinder crankcase flange portion 18 divided by a partition 19. An annular sleeve 20 surrounds the lower portion 18 of the crankcase.

Formed integrally on the top of annular sleeve 20 is an out-turned ring-like flange 21. An annular member 22 having a transversely disposed lower ring-like flange 23 is affixed to the lower housing 13. A plurality of resilient spring means 24 are provided between the rings 21 and 22 for resiliently supporting the crankcase within the outer housing.

Turning again to a consideration of the crankcase 16, it is seen that there are provided in the crankcase a plurality of separate cylinders 26. Though a four-cylinder compressor is illustrated, it will be understood that any desired number of cylinders may be employed. Cylinder sleeves or liners 27 are provided in each of the cylinders 26 and a suitable piston 28 is adapted to reciprocate within each of the cylinder liners 27. Each piston 28 has suitably mounted therein a wrist pin 30 upon which there is journalled one end of a connecting rod 32. The other end of each connecting rod 32 is affixed to the eccentric portion 35 of the crankshaft 34.

Provided in the end of each cylinder 26 and closing the end of the cylinder cavity are valve assemblies 36. Such valve assemblies may comprise a discharge valve unit 37, a suction valve plate 38, a suction valve or reed member 39. Each valve assembly is operative in a conventional manner.

The valve assemblies 36 are held in place in the end of a cylinder by means of the caps 40 which are maintained in place by a Belleville spring 42 and a retaining ring 44.

Provided on the crankcase are a pair of annular circular sealing flanges 48 and 50. These flanges are provided with recesses within which are disposed O-rings 52 and 53 for sealing between the sleeve 20 and the respective flanges 48 and 50. Defined between the crankcase and the annular shell 20 is a space 54 into which discharge gases are passed from the cylinders 26 after compression. The discharge gases pass from the annular chamber 54 through a conduit (not shown) to the conduit 56 for discharge from the compressor to the condenser of the refrigerating system in a known manner. The annular space 54 is provided with a plurality of cavities to impart a muffling effect to the discharge gases which are passed from the various cylinders of the compressor to the conduit 56.

Suction gas enters the outer housing of the compressor via suction line 62. The gas passes through a labyrinth or space 64 defined between flange 23 on sleeve member 22 and flange 21 on sleeve 20 into the top of the outer housing. Then the gas passes through opening 67 in the motor cap or end cap 66 affixed to the motor flange portion 17 of the crankcase and down over the electric motor 68, thereby cooling the motor. The suction gas passes through the motor compartment into the suction and discharge valve assemblies 36 via suction openings 70 provided therein. Thus, it is seen that the interior of the hermetic casing is substantially at suction pressure.

Opening means are provided in the compressor block 16 for communicating the interior of the crankcase with the annular space between the outer casing 12, 13 and the compressor block.

The motor 68 comprises a stator 72 which is mounted within the motor flange portion 17 of the compressor block or crankcase 16. The stator 72 is inductively connected to the rotor 74 which is affixed onto the upper portion 76 of the crankshaft 34. The rotor may be connected to the portion 76 of the drive shaft or crankshaft 34 by means of a key 78.

A plurality of terminals 80, 81, 82 and 83 are provided in the top of the upper housing portion 12 in order to conduct electrical current from a suitable source to the motor and provide for connection of suitable motor protection while preserving the hermetic nature of the compressor.

The crankshaft 34 is journalled within a lower bearing 86 which is mounted in the lower bearing head 87. The lower bearing head 87 is maintained in position by a suitable wedge lockspring or retaining ring 88 which seats within an annular groove in the compressor block. Also provided in the lower bearing head 87 is a thrust bearing 89 which has a central opening 90 defined therein. Located in the lower portion 91 of the crankshaft 34 adjacent the counterweight portion 93 is a coaxially disposed hole which constitutes the eye of the impeller of the pump means which are defined within the crankshaft.

Provided within the crankshaft 34 are three separate pump means—a pump 92 for lubricating the upper bearing surfaces defined between crankshaft 34 and upper bearings 94 and 96; a pump 99 (FIGURES 4 and 6) for providing a high-pressure supply of lubricant from the sump 98 defined within the outer casing at the bottom thereof to the connecting rod bearing surfaces; and a pump 97 for providing a low-pressure supply of lubricant from the sump 98 to the connecting rod bearing surfaces.

The pump 92 (FIGURES 1–3) comprises a lubricant passage 100 parallel to, but offset from, the vertical axis or center of rotation of the shaft 34, which communicates adjacent its lower end with a radial bore 101 intersecting the eye 102 of the pump means and at its upper end with transverse, radially disposed bores 103 and 105. The bore 103 communicates with an annular recess 104 in the periphery of shaft 34 for supplying lubricant to the upper bearing 94. Bore 105 supplies lubricant to the bearing 96. Oil entering the eye 102 of the pump is subjected to centrifugal forces set up by rotation of the shaft and moves upwardly in passage 100 and outwardly through the ports or bores 103 and 105 to lubricate the upper bearing surfaces.

A vent passage 106 may be provided in the upper end of crankshaft 34 for overcoming the tendency of vapor or foam to prevent proper lubrication of the upper bearing surfaces. Passage 106 communicates the passage 100 with an annular space 107 defined between the crankshaft and the upper portion of the compressor block. Provided beneath bearing 96 in the wall of the compressor block is a groove or skived out area 110 for communicating space 107 with the interior of the compressor. As is known in the art, a second vent passage may be formed in shaft 34.

The pumps 97 and 99 each comprise a vertically disposed passage in the bottom portion of shaft 34 which is offset from the vertical axis or center of rotation of the shaft. Each pump 97 and 99 is communicated at its lower end with the eye 102 of the pump means and at its upper end with respective bores or ports 113 and 114 for lubricating the connecting rod bearing surfaces. Preferably there is at least one port for each connecting rod affixed to the eccentric portion 35 of shaft 34.

As best seen in FIGURE 4, the eye or inlet 102 serves the three pumps formed in crankshaft 34. The inlet 102 communicates with vertical passage 100 of pump 92 via transverse or radial bore 101 which extends through the crankshaft, with the vertical passage of pump 97 via transverse or radial bore 112, and with the vertical passage of pump 99 via transverse or radial bore 116. The ends of bore 101 provide additional lubricant at the lower bearing. The ends of bores 112 and 116 define ports 117 and 118 which are adapted to provide additional lubricant at lower bearing 86. Thus, each of the bearing surfaces is supplied with lubricant under pressure.

Pump 97 differs from pump 99 in that it is vented at its upper end as best seen in FIGURES 2 and 4. A longitudinally extending vent passage defined by a groove 120 in the exterior surface of the crankshaft 34 connects the uppermost port 113 with the open area about the narrowmost portion of crankshaft 34 above the eccentric portion 35. As a result of its venting, pump 97 functions as a low-pressure pump. Pump 99, which is not vented, functions as a high-pressure pump.

The present construction, whereby both high and low pressure pumps, relatively speaking, are used to feed lubricant to the connecting rod bearing surfaces, promotes bearing life. The low-pressure pump 97 will supply lubricant as soon as the crankshaft commences rotation. The high-pressure pump may sometimes be inoperative for a short time at start up due to trapping of gas at the upper end of the lubricant passage, however such trapped gas or vapor works itself out in a short time and then pump functions to supply relatively high-pressure lubricant to the connecting rod bearing surfaces.

By the present arrangement, if a connecting rod were left out in assembly as sometimes happens, or if one connecting rod cracked in operation, only one pump would be rendered ineffective. The other pumps would remain operative. The salvage value of the compressor would be high for only one surface would be damaged and the compressor motor would not be burned out. Repair of the compressor could be effected by replacement of the crankshaft and/or a bearing. The high salvage value of the present design is contrasted with previous single pump constructions wherein cracking of a rod resulted in a loss of lubrication and damage to the entire compressor, including possible motor burn out. In such case, the compressor had to be replaced.

The present design improves refrigerant compressor lubrication by providing three pumps within the crankshaft, without weakening the narrow section of the crankshaft above the eccentric. The connecting rod bearing surfaces are lubricated by both high-pressure and low-pressure pumps and the upper bearings are fed by a separate pump. By modification of the crankshaft, the present invention may be incorporated into existing upright hermetic refrigerant compressors. The pumps have no moving parts and are therefore reliable in operation and relatively inexpensive to fabricate.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

I claim:

1. In a refrigerant compressor, the combination of outer casing means, means defining a crankcase in said outer casing means, cylinder means in said crankcase, piston means movable in said cylinder means, a vertically extending crankshaft in said crankcase, means operatively connecting said piston means to said crankshaft, the lower portion of the casing means defining a lubricant sump, a supply of lubricant in said sump, said crankshaft extending into said sump, said crankshaft being journalled in upper bearing means in said crankcase, and pump means in said crankshaft for lubricating the connecting means and the upper bearing means, said pump means comprising a first pump for lubricating the upper bearing means, a second pump for lubricating the connecting means and a third pump for lubricating the connecting means, said second pump being a high-pressure pump and said third pump being a low-pressure pump.

2. In a compressor, the combination of casing means, means defining a crankcase in said casing means, cylinder means in said crankcase, piston means movable in said cylinder means, a vertically extending crankshaft in said crankcase, means operatively connecting said piston means to said crankshaft, the lower portion of the casing means defining a lubricant sump, a supply of lubricant in said sump, said crankshaft extending into said sump, said crankshaft being journalled in upper and lower bearing means, and pump means in the crankshaft for lubricating the connecting means and the upper and lower bearing means, said pump means comprising a first longitudinally disposed pump passage eccentric of the axis of the crankshaft for lubricating the bearing means, a second longitudinally disposed pump passage eccentric of the axis of the crankshaft for lubricating the connecting means and a third longitudinally disposed pump passage eccentric of the axis of the crankshaft for lubricating the connecting means, said second pump passage being vented and thereby functioning as a low pressure pump, the third pump passage not being vented and thereby functioning as a high pressure pump.

3. In a compressor, the combination of casing means, means defining a crankcase in said casing means, cylinder means in said crankcase, piston means movable in said cylinder means, a vertically extending crankshaft in said crankcase, said crankshaft having an eccentric portion intermediate the ends thereof, means for operatively connecting the piston means to the eccentric portion of crankshaft, the lower portion of the casing means defining a lubricant sump, a supply of lubricant in said sump, the lower end of said crankshaft extending into said sump, said crankshaft being journalled in upper and lower bearing means, and pump means formed in the crankshaft for lubricating the connecting means and the upper and lower bearing means, said pump means comprising a first lubricant passage in said crankshaft extending upwardly from the bottom of said crankshaft through said eccentric portion and at least one transverse passage communicating said first lubricant passage to the exterior surface of the crankshaft for lubricating the upper bearing means, a second lubricant passage in said crankshaft extending upwardly from the bottom of the crankshaft, at least one transverse passage communicating the second lubricant passage to the exterior surface of the crankshaft for lubricating the connecting means, and a third lubricant passage in said crankshaft extending upwardly from the bottom of said crankshaft, at least one transverse passage communicating said third lubricant passage with the exterior surface of the crankshaft for lubricating the connecting means, said second transverse passage being vented to the interior of the crankcase, whereby the second lubricant passage and its associated transverse passage function as a low pressure pump and the third lubricant passage and its associated transverse passage function as a high pressure pump.

4. In an upright, hermetically enclosed multi-cylinder refrigerant compressor of the type including a vertically-disposed rotary drive shaft journalled in a first bearing above the level of lubricant in the sump and having connecting rod bearing surfaces which require lubrication formed on the eccentric portion of the drive shaft, the improvement comprising a plurality of pump means formed integrally in said drive shaft, said drive shaft having axially extending bore means disposed in the bottom portion thereof adapted to be disposed within the sump, a first longitudinally-disposed passage in said drive shaft offset from the axis of rotation and communicating at its lower end with said bore means and at its upper end with the surface of the drive shaft journalled in said first bearing, said first passage defining a first pump in said drive shaft for lubricating said first bearing, a second longitudinally-disposed passage in said drive shaft offset from the axis of rotation and communicating at its lower end with said bore means and at its upper end with the connecting rod bearing surface, said passage being vented to the interior of the hermetically enclosed compressor by means including an opening in the surface of said drive shaft which extends beyond the connecting rod bearing surface, said second passage defining a second low-pressure pump in said drive shaft, and a third longitudinally-disposed passage in said drive shaft offset from the axis of rotation and communicating at its lower end with said bore means and at its upper end with the connecting rod bearing surface, said third passage defining a third high-pressure pump in said drive shaft.

5. In a multi-cylinder refrigerant compressor, the combination of casing means, means defining a crankcase in said casing means, a plurality of cylinder means in said crankcase, a plurality of piston means movable in said cylinder means, a vertically-extending crankshaft in said crankcase having a single eccentric portion thereon, there being a narrow section of reduced cross section above the eccentric portion between the eccentric portion and the upper end of the crankshaft, means operatively connecting each of said piston means to said eccentric portion on said crankshaft, the lower portion of the casing means defining a lubricant sump, a supply of lubricant in said sump, the lower end of said crankshaft extending into said sump, said crankshaft being journalled in upper and lower bearing means, and pump means in the crankshaft for lubricating the bearing surfaces between the connecting means for the piston means and the eccentric portion of the crankshaft and for lubricating the upper and lower bearing means, said pump means comprising a first longitudinal pump passage disposed eccentrically of the axis of the crankshaft and extending through the eccentric portion for lubricating the upper and lower bearing means, a second longitudinal pump passage disposed eccentric of the axis of the crankshaft for lubricating each of said connecting means and a third longitudinal pump passage disposed eccentric of the axis of the crankshaft for lubricating each of said connecting means, said second pump passage and said third pump passage extending from the lower end of the crankshaft into the eccentric portion but short of said narrow section, said second pump passage being vented and said third pump passage not being vented, whereby the second pump passage functions as a low-pressure pump and the third pump passage functions as a high-pressure pump.

6. A compressor as in claim 5, wherein there communicates with the second pump passage a surface groove that extends beyond the connecting means bearing surfaces for venting oil and gas from the second pump passage.

References Cited by the Examiner
UNITED STATES PATENTS

| | | | |
|---|---|---|---|
| 2,274,943 | 3/1942 | Touborg | 230—206 |
| 3,098,604 | 7/1963 | Dubberley | 230—206 |
| 3,154,244 | 10/1964 | Touborg | 230—206 |

ROBERT M. WALKER, *Primary Examiner.*